United States Patent
Kaji et al.

(10) Patent No.: US 6,735,576 B1
(45) Date of Patent: May 11, 2004

(54) METHOD OF REAL-TIME OPTIMIZATION OF CONTROL DEVICE EQUIPPED WITH FUZZY INFERENCE SYSTEM

(75) Inventors: Hirotaka Kaji, Shizuoka (JP); Masashi Yamaguchi, Shizuoka (JP); Hiroshi Harada, Shizuoka (JP); Yukio Matsushita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 586 days.

(21) Appl. No.: 09/661,768

(22) Filed: Sep. 14, 2000

(30) Foreign Application Priority Data

Sep. 14, 1999 (JP) ............................................. 11-261109

(51) Int. Cl.[7] ................................................. G06N 7/02
(52) U.S. Cl. ...................... 706/1; 706/2; 706/3; 706/45
(58) Field of Search .............................. 706/1, 2, 3, 45, 706/47

(56) References Cited

U.S. PATENT DOCUMENTS

| | | |
|---|---|---|
| 4,785,404 A | 11/1988 | Sims et al. |
| 4,931,025 A | 6/1990 | Torigai et al. |
| 5,006,992 A | 4/1991 | Skeirik |
| 5,263,432 A | 11/1993 | Davis |
| 5,465,204 A | 11/1995 | Sekine et al. |
| 5,683,275 A | 11/1997 | Nanami |
| 5,813,390 A | 9/1998 | Anamoto |

FOREIGN PATENT DOCUMENTS

| | | |
|---|---|---|
| EP | 0 957 416 A1 | 11/1999 |
| WO | WO 98/37465 | 8/1998 |
| WO | WO 98/50831 | 11/1998 |

OTHER PUBLICATIONS

Janikow, Cezary Z., A Genetic Algorithm for Learning Fuzzy Controllers, Proceedings of the 1994 ACM symposium on Applied computing, Apr. 1994, pp. 232–236.*

Gopalan, Vijayarangan et al, Fuzzy genetic controllers for the autonomous rendezvous and docking problem, Proceedings of the 1995 ACM symposium on Applied computing, Feb. 1995, pp. 532–536.*

Pham, Trung T., Genetic algorithm for fuzzy modeling of robotic manipulators, Proceedings of the 1996 ACM symposium on Applied Computing, Feb. 1996, pp. 600–604.*

Chiu, Kuan–Shiu et al, GA design of crisp–fuzzy logic controllers, Proceedings of the 1999 ACM symposium on Applied computing, Feb. 1999, pp. 238–242.*

Ng, Kim Chwee et al, Design of sophisticated fuzzy logic controllers using genetic algorithms, Fuzzy Systems, 1994. IEEE World Congress on Computational Intelligence, Proceedings of the Third IEEE Conference on, Jun. 26–29, 1994, Page(s): 1708–1712 vol. 3.*

(List continued on next page.)

Primary Examiner—Wilbert L. Starks, Jr.
(74) Attorney, Agent, or Firm—Knobbe, Martens, Olson & Bear LLP

(57) ABSTRACT

Real-time optimization is conducted for a control device having a fuzzy inference system that can optimize characteristics of the control device in real time, by coding parameters used in the fuzzy inference system into chromosomes, and optimizing in real time the output of the control device by subjecting the chromosomes to evolutionary computation. Coding is conducted by (i) revising a matrix of fuzzy rules used in the system by extracting a section from the matrix and coding elements of the section into chromosomes; (ii) modifying the configuration of the fuzzy rule matrix defined by membership functions by coding elements of the membership functions into chromosomes; or (iii) changing a level of an input of the parameters and a level of an output of the fuzzy inference system.

19 Claims, 15 Drawing Sheets

OTHER PUBLICATIONS

Tang, Kit–Sang et al, Minimal fuzzy memberships and rules using heirarchical genetic algorithms, Industrial Electronics, IEEE Transactions on, vol.: 45 Issue: 1, Feb. 1998, Page(s): 162–169.*

Chan, P.T. et al, An optimised fuzzy logic controller, Fuzzy Systems, 1997., Proceedings of the Sixth IEEE International Conference on, vol.: 2, Jul. 1–5, 1997, Page(s): 975–980 vol 2.*

D.D. Siljak, et al., On Hierarchic Optimal Control of Large–Scale Systems, $8^{th}$ Asilomar Conference on Circuits, Systems and computers, Dec. 3, 1974, pp. 495–502.

T. Sadeghi, et al. Computer–Aided Design of Control Systems via Parameter Optimization Method (CADCS/POM): an Interactive Graphics Approach, Proceedings of the 1984 Americal Control Conference, Jun. 6, 1984, pp. 1634–1640.

* cited by examiner

Fitness table

|  | FAST | MID | SLOW |
|---|---|---|---|
| PL |  |  |  |
| PS |  | 0.42 | 0.28 |
| ZR |  | 0.18 | 0.12 |
| NS |  |  |  |
| NL |  |  |  |

Acceleration (rows) / Speed (columns)

Add →

Total table

|  | FAST | MID | SLOW |
|---|---|---|---|
| PL | 0.02 | 1.87 | 0.27 |
| PS | 4.96 | 8.39 | 3.72 |
| ZR | 12.61 | ① 86.42 | ③ 35.48 |
| NS | 9.55 | ② 49.75 | ④ 22.37 |
| NL | 8.96 | 18.19 | 2.44 |

Acceleration (rows) / Speed (columns)

*Figure 10*

Evolutionary computation module (GA)

Evolutionary computation module (ES)

METHOD OF REAL-TIME OPTIMIZATION OF CONTROL DEVICE EQUIPPED WITH FUZZY INFERENCE SYSTEM

BACKGROUND OF THE INVENTION

1. Field of the Invention

The invention relates to a method of optimizing a control device using fuzzy inference system so that a controlled system can be controlled.

2. Description of the Related Art

In the past, optimum values of the characteristics of a fuzzy controller (that is, values of the parameters such as the number, shape, position and/or expanse of membership functions, the fuzzy rules, and the standardized coefficients for input and output values) to control a controlled system were determined by experiment or experience in a design stage or a setting stage before shipment so that when use a environment and a user are supposed for a product that will be a controlled system, the supposed characteristics (preference, ability, personality, and use condition) of a use environment and a user can be met.

However, with the advent of diverse and highly advanced control technique, the conventional method of experimentally deciding optimum values for the characteristics of a fuzzy controller increases difficulty to optimize the fuzzy controller and needs to have a lot of time. Moreover, since a use environment of products, disturbance or a user's personality differs from individual to individual, the method does not enable all the users to satisfy the products of the characteristics.

SUMMARY OF THE INVENTION

To solve the problem, methods can be considered which, using fuzzy inference, neural networks, or heuristic rules, optimize output characteristics of a fuzzy controller that controls a controlled system in according to expected characteristics of a use environment and a user with a narrow range of variations which is also expected in advance. Since the methods can optimize the characteristics of the fuzzy controller in real time, the controller can handle variations of the characteristics of a use environment and a user.

However, the methods mentioned above have a problem in that when an variation of the characteristics of a use environment and a user, which cannot be expected when designing the system, takes place, the characteristics of the fuzzy controller cannot be optimized. The problem occurs not only in fuzzy controllers but also in controllers themselves having a fuzzy inference system. An embodiment of the present invention resolves the problem. Even when variations of characteristics of a use environment and a user occur, a control device having a fuzzy inference system can be optimized in real-time while the control device controls the controlled system, or the controlled system is being operated or on-line.

The method of real-time optimization of the control device in accordance with an embodiment of the invention (a) codes into chromosomes parameters used in a fuzzy inference system, which determines an output associated with a manipulated variable of a machine (controlled system) based on preselected input signals, and (b) optimizing in real time the output of the control device using evolutionary computation.

Evaluation of the evolutionary computation can be made based on evaluation criteria selected beforehand, or user's intention.

The parameters may be (i) the number, shape, position and/or expanse of membership functions for the fuzzy inference system of the control device, (ii) fuzzy rules, or (iii) standardized coefficients for input and output values.

The fuzzy rules can be compiled in the form of a fuzzy rule matrix. The configuration of the matrix may be defined by membership functions. Each section of the matrix represents a fuzzy rule which is a parameter having a value. The type of parameter and a value of the parameter are referred to as "a parameter".

Coding into chromosomes can be made on all of the parameters or part thereof selected for the fuzzy controller.

Selection of part of the parameters can be carried out stochastically or deterministically starting from a membership function or a fuzzy rule having the highest total values of fitness in a fixed interval of time, which is the most frequently used parameters, until a preselected number of parameters are selected. To be specific, for example, a roulette selection of five positional parameters for membership functions are made proportional to the ratio of their total values of fitness to the overall fitness, or a selection of parameters for an expanse of membership functions is made in the order of size so that a total value of fitness can occupy over 80 percent of the entirety.

In selecting part of parameters, only some parameters that exceed a threshold of fitness fixed regarding the parameters can be selected. To be concrete, for example, depending on the ratio of a total of fitness to the entirety, a roulette selection of five fuzzy rules are made, or a selection of fuzzy rules are made in the order of size so that a total of fitness occupies over 80 percent of the entirety.

In deciding a threshold, the threshold can be made higher or lower depending on the numbers selected or the time spent till a selection is made.

As the fuzzy inference system, a minimax center-of-gravity method, an algebraic sum addition center-of-gravity method, a simplified inference method, a inference method having the degree of conviction, or a functional inference method can be employed. As the membership function, a one-dimensional membership function and/or a multi-dimensional membership function can be used.

As the evolutionary calculation, a genetic algorithm, an evolutionary strategy or an evolutionary programming may be used.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 10 illustrates one example of seeking a total of fitness of fuzzy rules.

DETAILED DESCRIPTION OF THE PREFERRED EMBODIMENT

Figure 1:
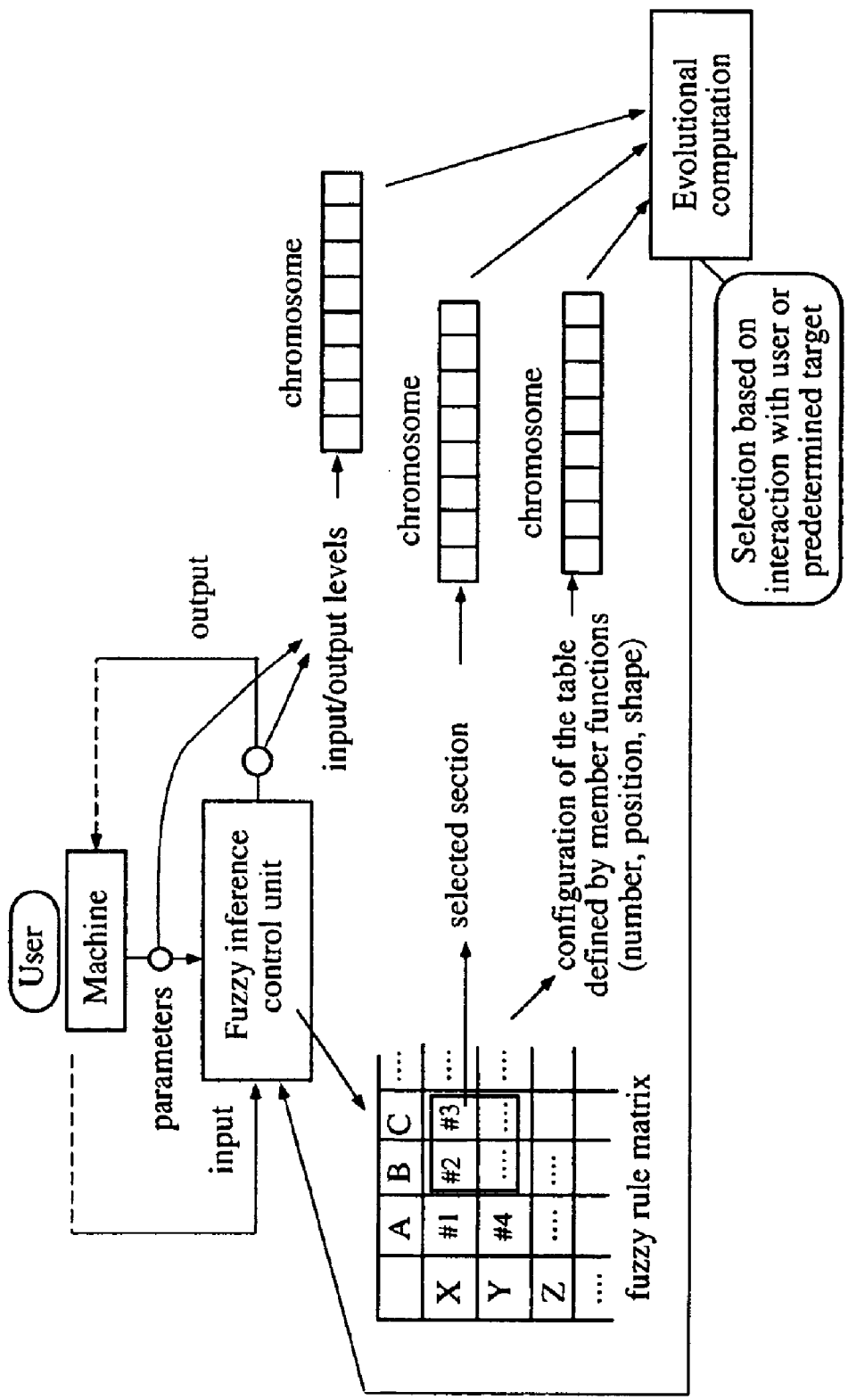
FIG. 1 is a schematic diagram showing an embodiment of the optimization method according to the present invention.

FIG. 1 is a diagram showing an embodiment of the method of real-time optimization of a control device provided with a fuzzy inference system for controlling a machine. The fuzzy inference system comprises a matrix of fuzzy rules which are regulated by preselected parameters. The method comprises the steps of:

(a) operating the machine using the fuzzy inference system of the control device;

(b) optimizing in real-time the input-output relationship of the fuzzy inference system by at least one of the following: (i) revising the fuzzy rule matrix by extracting a section from the matrix and coding elements of the section into chromosomes; (ii) modifying the configuration of the fuzzy rule matrix defined by membership functions by coding elements of the membership functions into chromosomes; or (iii) changing a level of an input of the parameters and a level of an output of the fuzzy inference system, wherein the chromosomes are subjected to evolutionary computation, whereby at least one fitted individual is selected based on user's ultimate choice or a pre-selected target; and (c) operating the machine using the optimized fuzzy inference system.

In the above, the method may further comprise monitoring the fuzzy rule matrix in use while operating the machine, and evaluating the section extracted in (ii) or the membership functions to be modified in (iii).

Some embodiments of the method for real-time optimization of a control device having a fuzzy inference system in accordance with the invention (simply called "the optimization method" hereinafter) will be explained herein below, referring to the embodiments in the accompanied figures.

Figure 2:
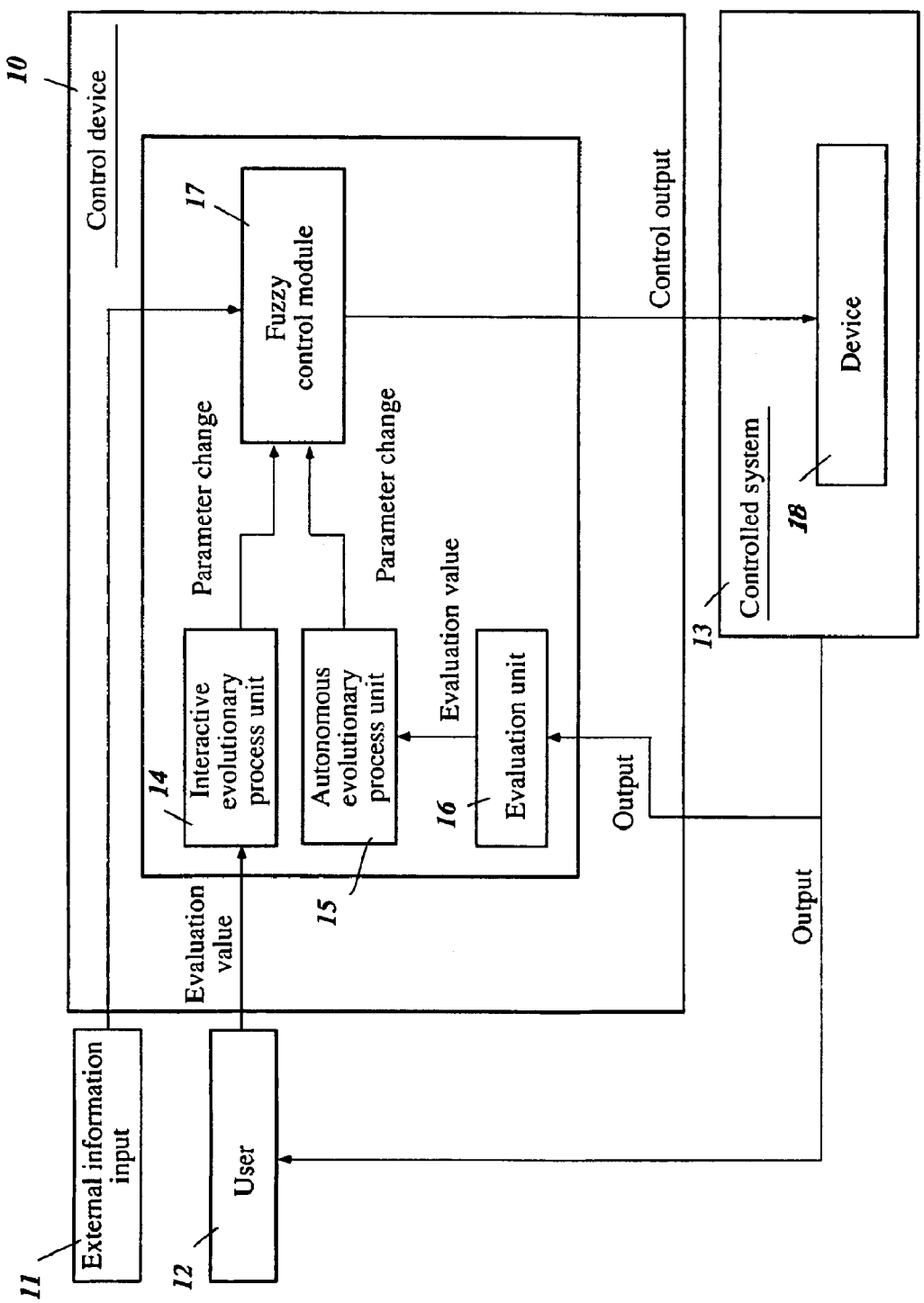
FIG. 2 is a block diagram showing one embodiment of a control device utilizing an optimization method in accordance with the invention.

FIG. 2 is a block diagram showing one embodiment of a control device utilizing the optimization method in accordance with the invention. A control device 10 includes an interactive evolutionary process unit 14, an autonomous evolutionary process unit 15, an evaluation unit 16, and a fuzzy control module 17. The evaluation unit 16 is connected to the autonomous evolutionary process unit 15, which, together with the interactive evolutionary process unit 14, is connected to the fuzzy control module 17. A controlled system 13 includes a device 18, which is connected to the fuzzy control module 17. The controlled system 13 is connected to the evaluation unit 16 and applies output to the evaluation unit 16 and a user 12.

The fuzzy control module 17 receives information from an external information input 11, and parameter changes from the interactive evolutionary process unit 14 and the autonomous evolutionary process unit 15, and outputs to the controlled system 13 an control output as a manipulated variable, including compensated amount or compensation coefficients. The fuzzy control module 17 may be a so-called fuzzy controller, but is not limited to it. The fuzzy control module 17 can be any control module as far as the control module adopts a fuzzy inference system; for example, the fuzzy control module 17 can be a module that adopts a fuzzy intention decision system or a fuzzy neural controller.

The interactive evolutionary process unit 14 and the autonomous evolutionary process unit 15 optimize the parameters on a fuzzy inference system in the fuzzy control module 17, while the controlled system 13 is working, that is, in real time. The parameters to be optimized can be any type of parameter as long as the parameters are related to a fuzzy inference system. For example, cited as such are the parameters for deciding the number, shape, position and expanse of membership functions, the fuzzy rules, and the standardized coefficients for input and output values.

With regard to evaluation for optimization, the interactive evolutionary process unit 14 receives evaluation value applied by the user 12, and the autonomous evolutionary process unit 15 accepts evaluation values from the evaluation unit 16 which is designed beforehand based on predetermined evaluation criteria Thus, since the parameters regarding the fuzzy inference system are optimized in real time, the invention can handle users' preferences or various types of use environment, which eliminates limitations imposed on the controlled system using a fuzzy inference system.

Next, some embodiments where the optimization method in accordance with the invention is applied to a controlled system will be explained below. FIGS. 3–14 show an embodiment where the optimization method is applied to a outboard motor for a planing boat and a trimming apparatus.

Figure 3:
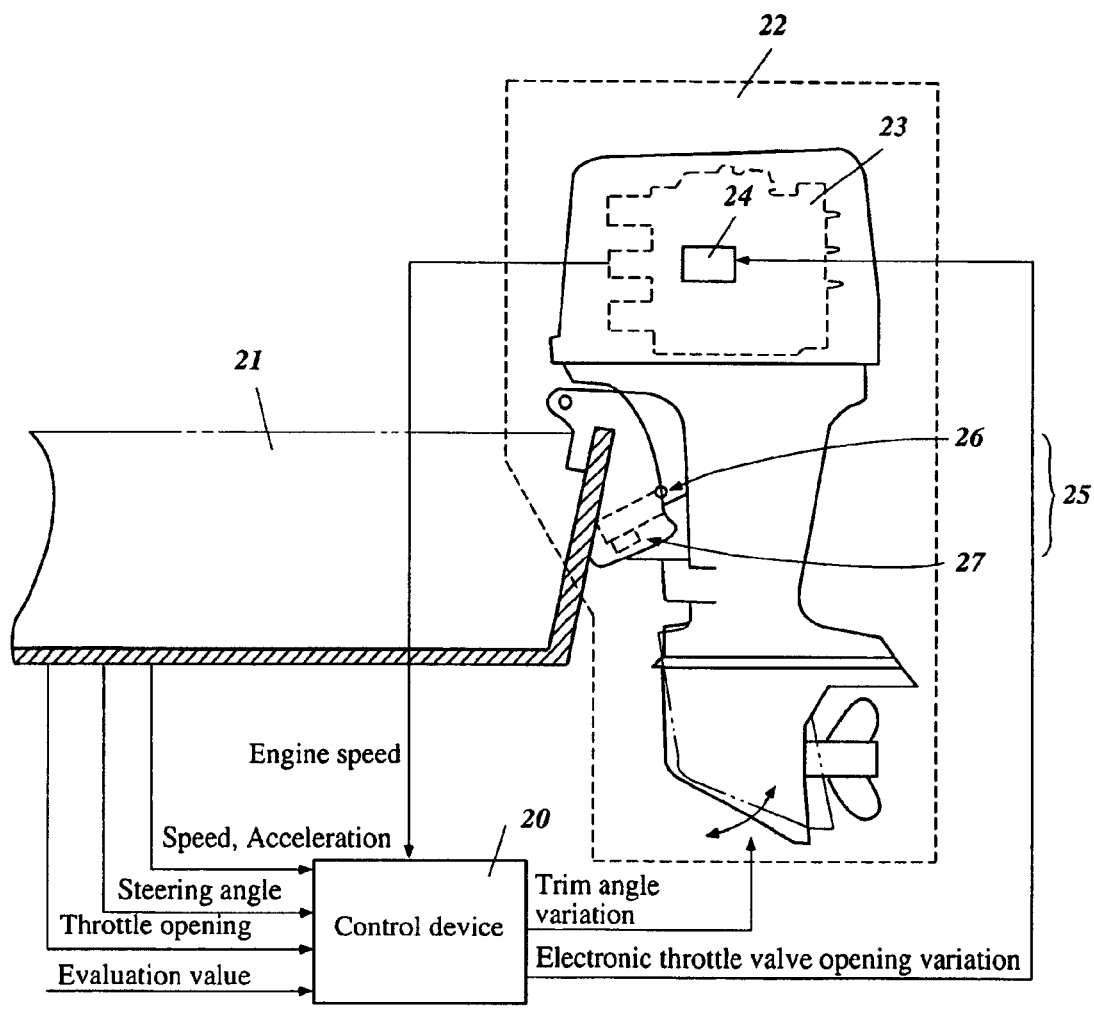
FIG. 3 is a figure illustrating a control device and a outboard motor including a trimming apparatus.

FIG. 3 is a figure illustrating a control device and a outboard motor including a trimming apparatus. A outboard motor 22 is mounted to a hull 21. The outboard motor 22 includes an engine 23 for operating the hull 21 and a trimming apparatus for controlling the cruising direction of the hull 21. The engine 23 has an electronic throttle valve 24 for controlling the speed thereof. The trimming apparatus contains a hydraulic cylinder 26 and a hydraulic pump 27. The outboard motor 22 is connected to an control device 20.

The control device 20 optimizes boat operation characteristics which realize a constant speed navigation control in response to changes in the movement of the hull 21 and disturbances. The control device 20 also optimizes the boat operation characteristics, by responding to preferences of users—when the users are different, or when the preferences of even one and the same user vary dependent on time, for example, when his preferences vary in spring or fall. The "boat operation characteristics" herein mean boat speed control characteristics by the operations of the electronic throttle valve 24 and the trimming apparatus 25.

The control device 20 inputs the engine speed, the speed, acceleration, steering angle, and throttle opening of the hull 21, and the evaluation value, and outputs an electronic throttle valve opening variation and a trim angle variation to operate the electronic throttle valve 24 and the trimming apparatus 25, respectively, which controls intake of air and posture of the hull for constant speed navigation control.

Figure 4:
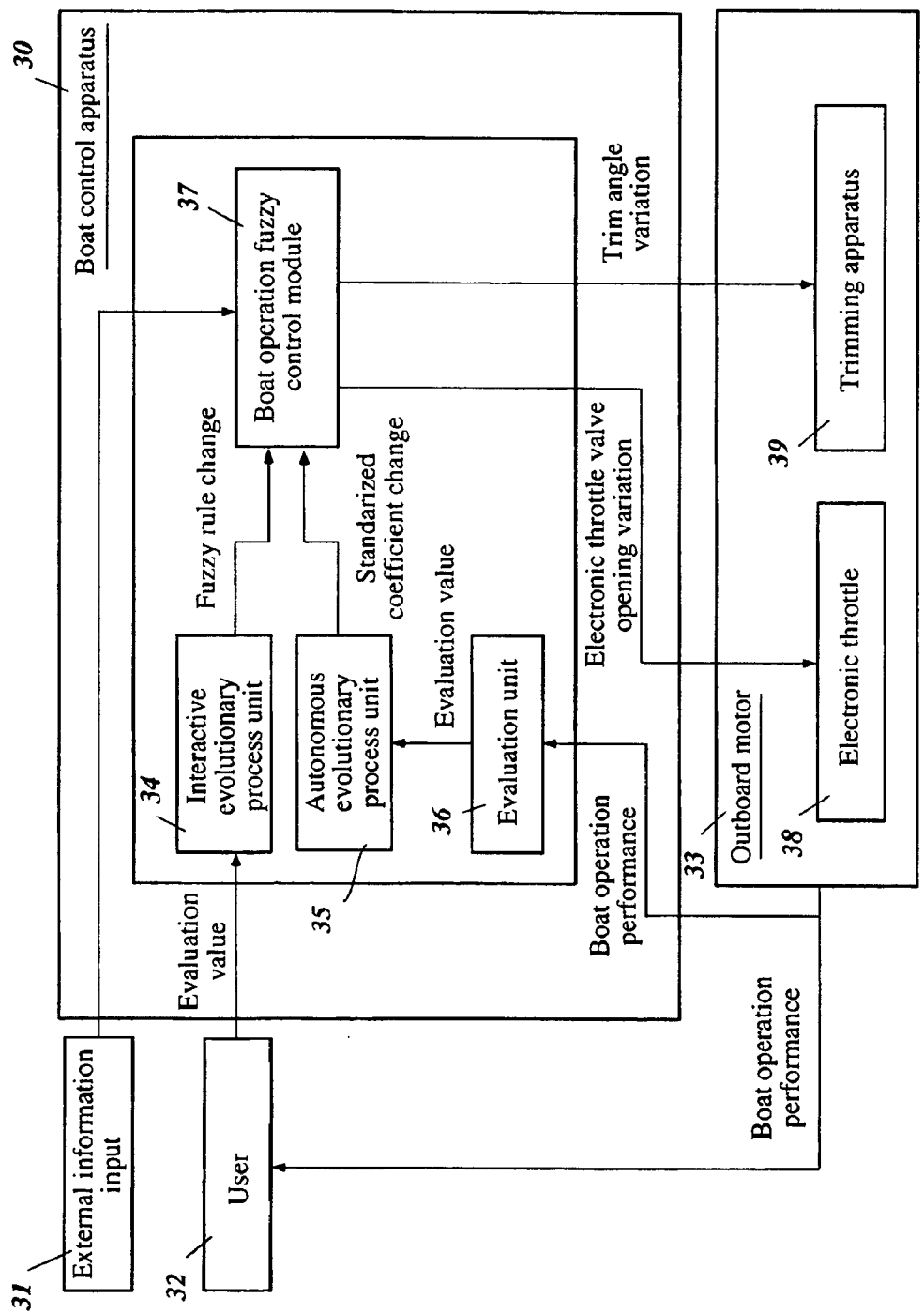
FIG. 4 is a block diagram illustrating a boat control apparatus and an outboard motor where the boat control apparatus is a control device and the outboard motor is a controlled system.

FIG. 4 is a block diagram illustrating a boat control apparatus and an outboard motor where the boat control apparatus is a control device and the outboard motor is a controlled system. A boat control apparatus 30 includes an interactive evolutionary process unit 34, an autonomous evolutionary process unit 35, an evaluation unit 36, and a boat operation fuzzy control module 37. The evaluation unit 36 is connected to the autonomous evolutionary process unit 35, which, together with the interactive evolutionary process unit 34, is connected to the boat operation fuzzy control module 37. An outboard motor 33 includes an electronic throttle 38 and a trimming apparatus 39, both of which are connected to the boat operation fuzzy control module 37. The outboard motor 33 is connected to the evaluation unit 36 and applies boat operation performance to the evaluation unit 36 and a user 32.

The evaluation unit 36 outputs an evaluation value to evaluate the autonomous evolutionary process unit 35. The autonomous evolutionary process unit 35 optimizes standardized coefficients—the coefficients that adjust the size of input and output information—for the boat operation fuzzy control module 37. The interactive evolutionary process unit 34 inputs evaluation value from the user 32 and optimizes fuzzy rules for the boat operation fuzzy control module 37. The boat operation fuzzy control module 37 outputs an electronic throttle valve opening variation and a trim angle variation in response to output from an external information input 31, change of fuzzy rules from the interactive evolutionary process unit 34, and change of standardized coefficients from the autonomous evolutionary process unit 35.

The boat operation fuzzy control module 37 employs a simplified inference method as a fuzzy inference system, and outputs an electronic throttle valve opening variation and a trim angle variation in response to the engine speed, speed, acceleration, and steering angle. A fuzzy rule table can be designed based on the boat operation knowledge of the skilled. The fuzzy rule is expressed by real number values.

Figure 5:
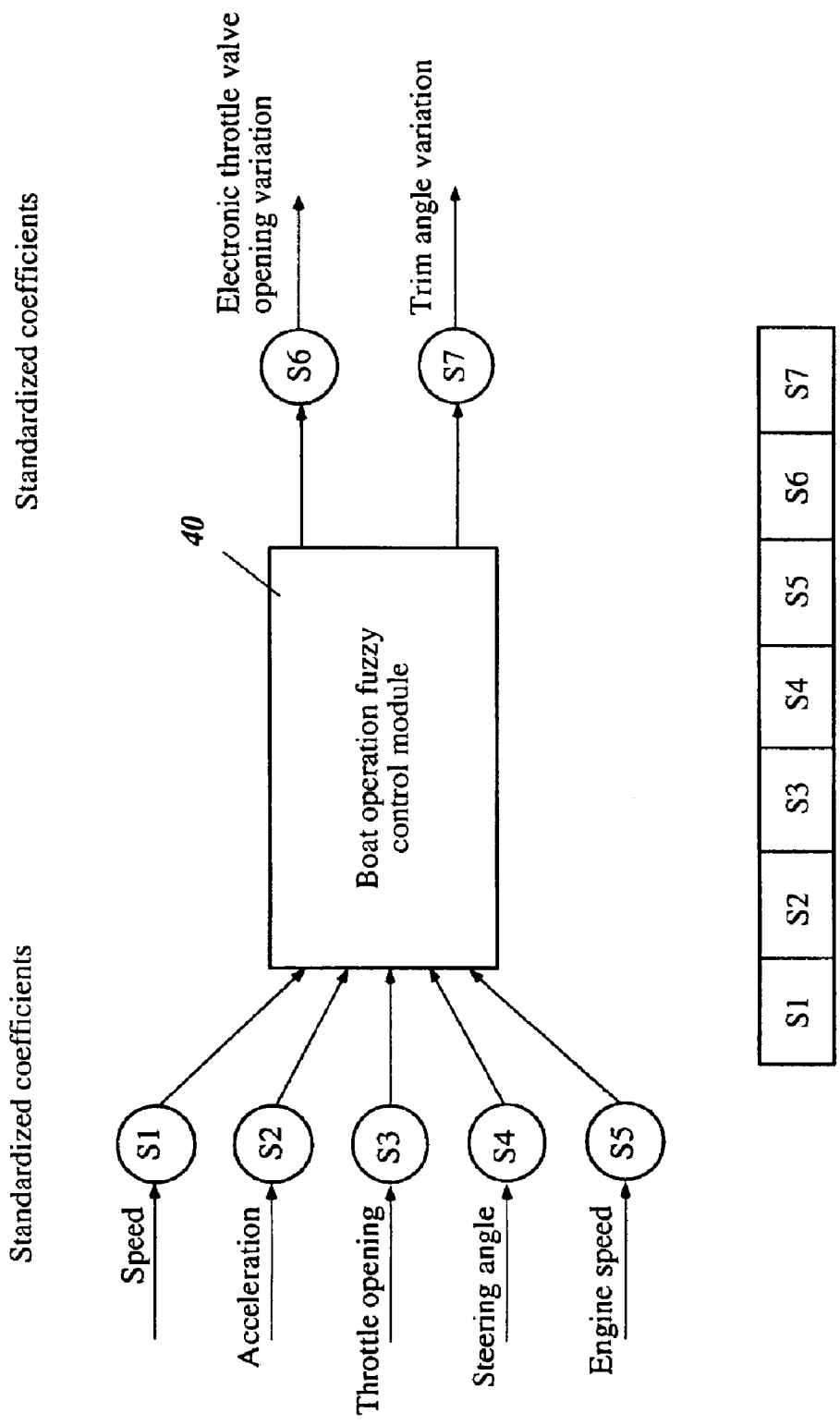
FIG. 5 illustrates relationship between standardized coefficients of a boat operation fuzzy control module and individuals produced by encoding them.

FIG. 5 illustrates relationship between standardized coefficients of the boat operation fuzzy control module 40 (corresponding to reference numeral 37 in FIG. 4) and individuals produced by encoding them. The speed is applied to standard coefficient S1; the acceleration, S2: the throttle opening, S3; the steering angle, S4; the engine speed, S5. Each of the information is applied to the boat operation fuzzy control module 40 through its corresponding standard coefficient. The boat operation fuzzy control module 40 outputs the electronic throttle valve opening variation and the trim angle variation through the corresponding standard coefficient S6 and S7, respectively.

The autonomous evolutionary process unit 35 uses a genetic algorithm, and encodes the standardized coefficients of the boat operation fuzzy control module 40 as shown in FIG. 5 to produce individuals. The autonomous evolutionary process unit 35 optimizes the standardized coefficients by using the genetic algorithm. With regard to evaluation of each individual during autonomous evolutionary process, about boat operating characteristics, higher evaluation values are provided by the evaluation unit 36 as an error between an actual speed and a reference a user has fixed gets closer to a desired range. As a result, the standardized coefficients of the boat operation fuzzy control module 37 are automatically optimized towards the desired boat operating characteristics, and an optimal boat operating characteristic is obtained even when the use environment changes or the hull moves inappropriately.

Thus, the method, by which the evaluation in evolutionary process is made by the evaluation unit 36 designed beforehand and the optimization is automatically performed, is called autonomous evaluation herein.

Figure 6:
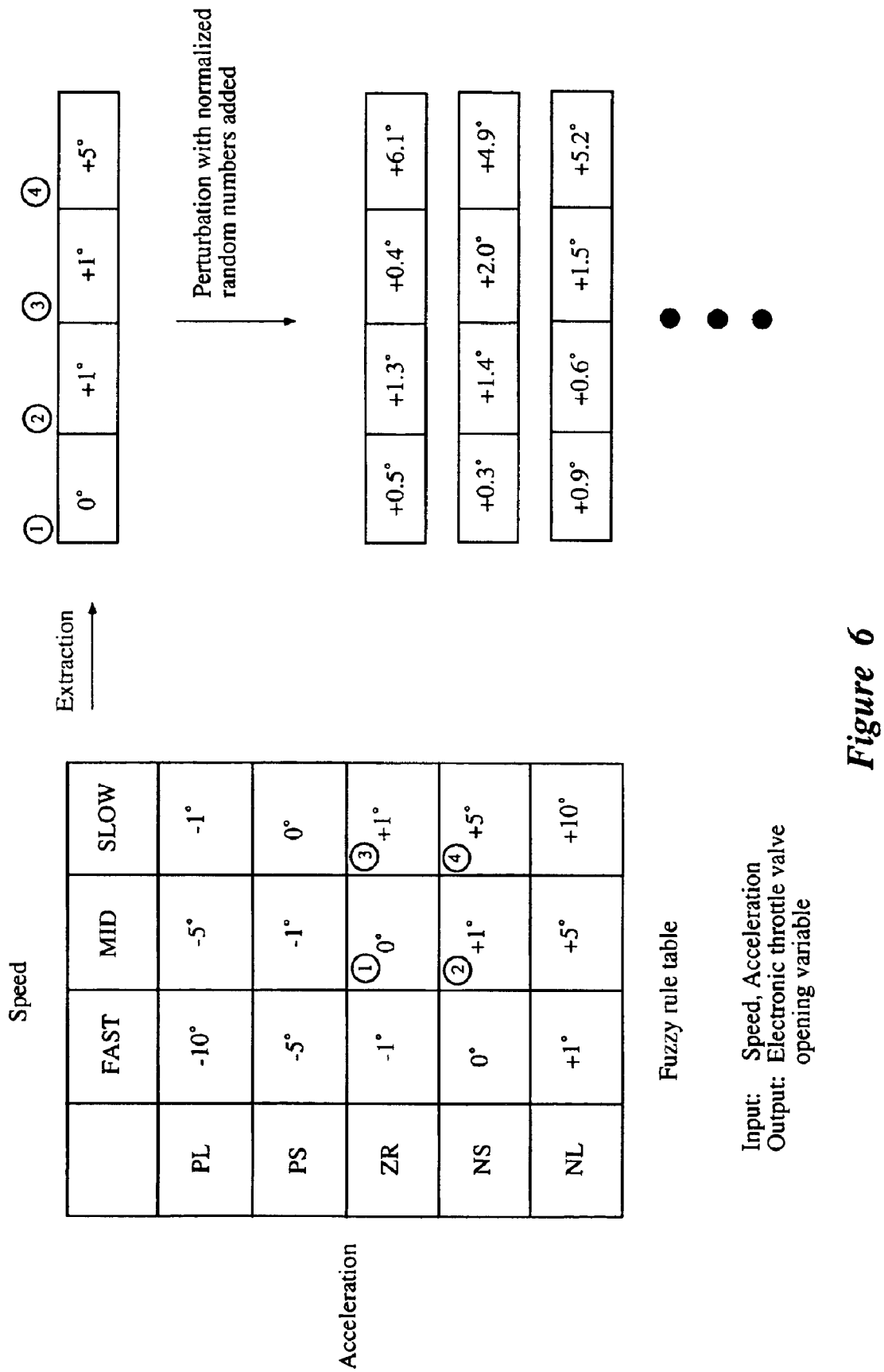
FIG. 6 illustrates relationship between a fuzzy control table of a boat operation fuzzy control module and individuals produced by encoding part of it.

FIG. 6 illustrates relationship between a fuzzy rule table of the boat operation fuzzy control module and individuals produced by encoding part of it. The autonomous evolutionary process unit 34 uses a genetic algorithm, by which part of the fuzzy rule table for the boat operation fuzzy control module 37 is encoded to produce the individuals, and optimizes the part of the fuzzy rule table using the genetic algorithm. The evaluation of each of the individuals during interactive optimum process is done based on the comfortableness of the ride the user experiences. As a result, the part of the fuzzy rule table is optimized based on the evaluation of the user to produce an optimal boat operating characteristic suitable for the user's evaluation.

The method the user employs about the evaluation in evolutionary process is called interactive evaluation herein. The evolutionary process in the boat control apparatus 30 will be explained below.

Figure 7:
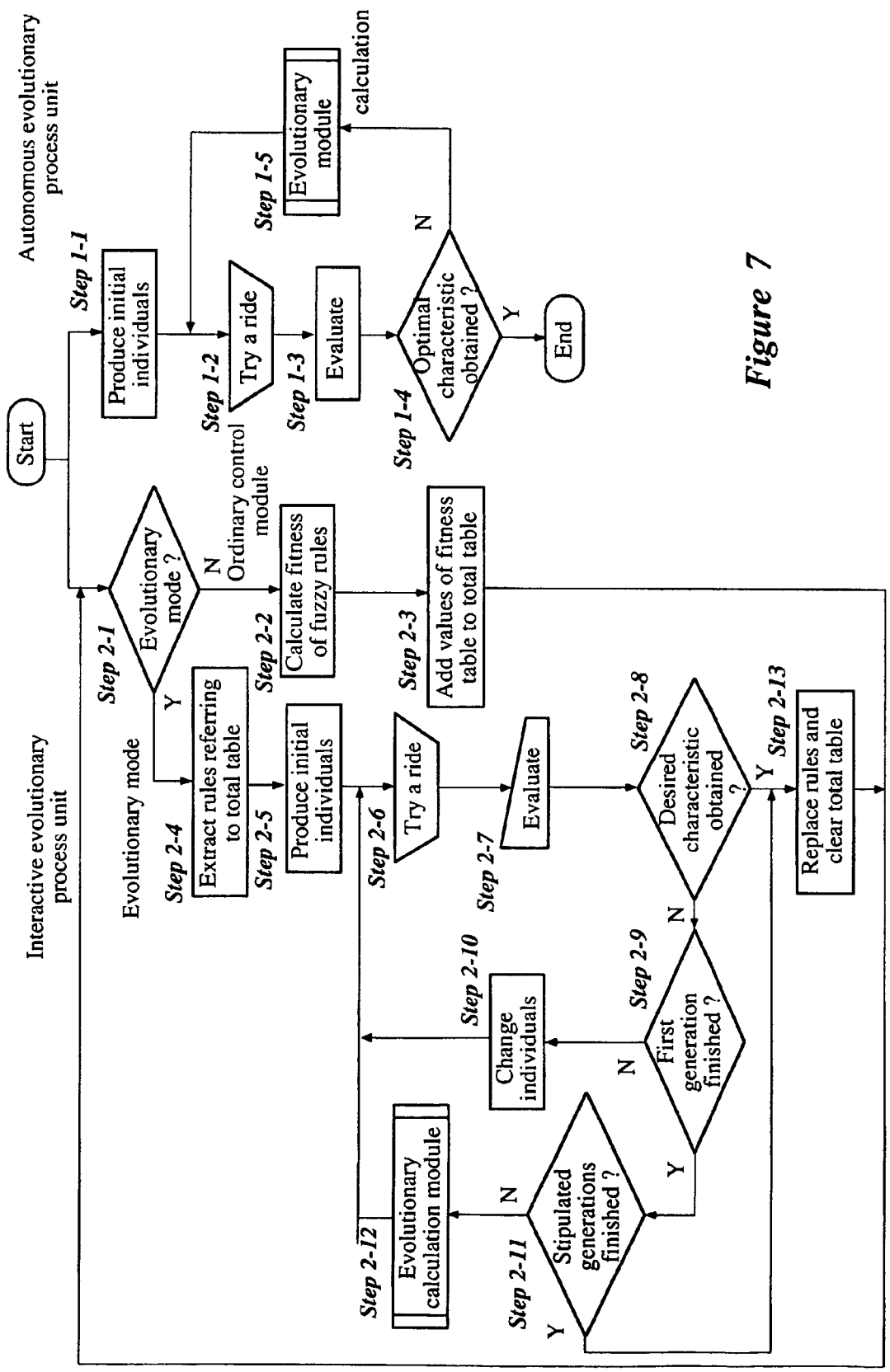
FIG. 7 is a flowchart illustrating evolutionary process by a control device.

FIG. 7 is a flowchart illustrating evolutionary process by the boat control apparatus 30 as a control device. The boat control apparatus 30, in doing evolutionary process, performs an autonomous evaluation by the autonomous evolutionary process unit 35 and an interactive evaluation by the interactive evolutionary process unit 34.

When evaluation methods are different, the flows of optimal process will be different. Accordingly, an evolutionary process adopting an autonomous evaluation method and an evolutionary process employing an interactive autonomous evaluation method are explained individually.

a. Evolutionary Process in an Autonomous Evolutionary Process Unit

As shown in FIG. 7, initial values of the standardized coefficients are determined at random within a range decided beforehand to produce first generation comprising a plurality of initial individuals (step 1-1). A constant speed navigation evaluation about all the individuals in the first generation is performed (step 1-2). The constant speed navigation evaluation is explained here. A plurality of individuals are operated in parallel by time division and evaluation values are compared by a total of the duration.

Figure 8:
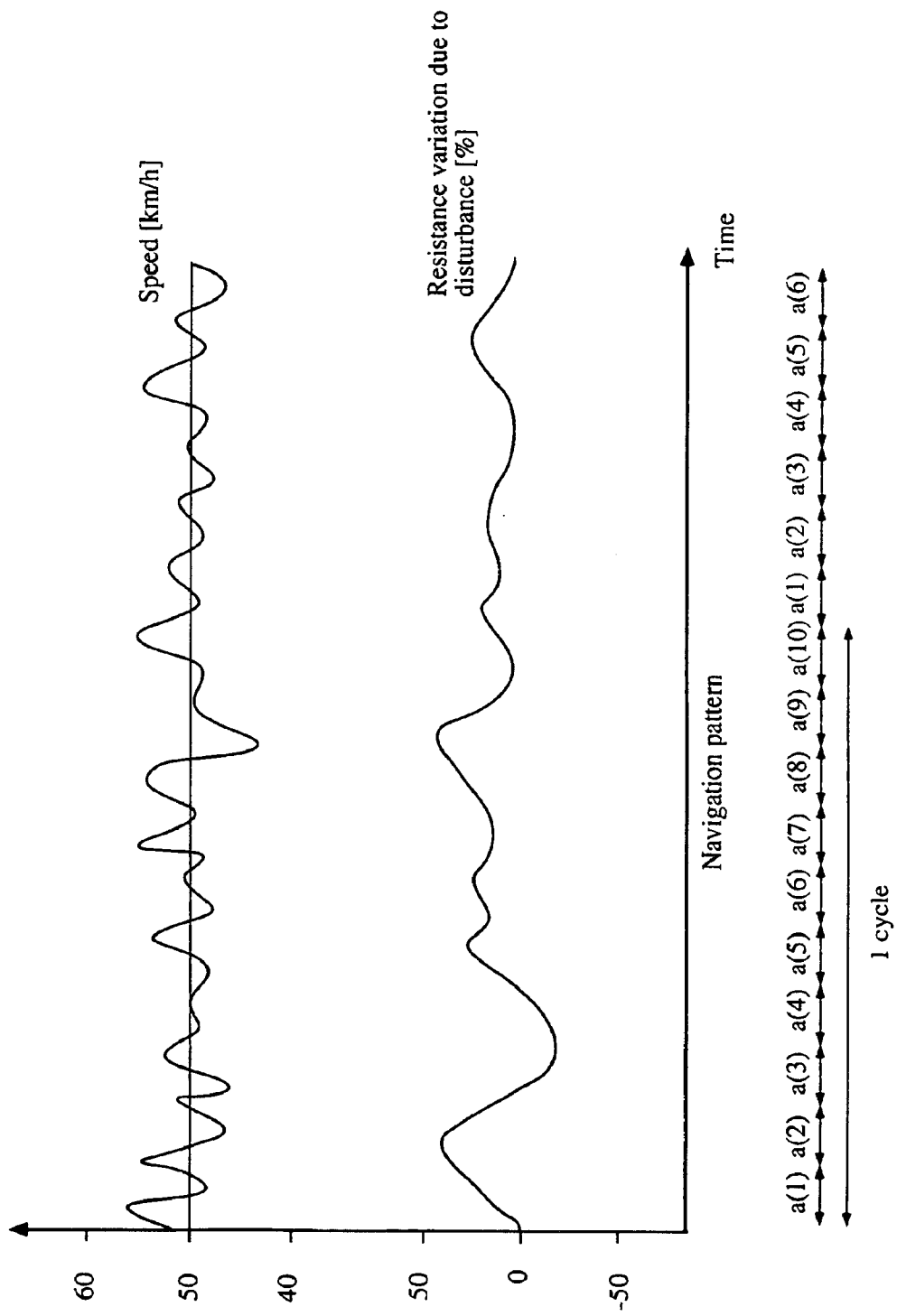
FIG. 8 is a graph illustrating one example of performing time division when a plurality of individuals are evaluated by time division.

FIG. 8 is a graph illustrating one example of performing time division when a plurality of individuals are evaluated by time division. As shown in the figure, ten individuals are controlled every one minute, and absolute values of the difference between a reference and an actual speed are totaled every sampling time. Making this one cycle, twenty cycles are repeated to calculate a total within an evaluation period as an evaluation value. By doing so, since influence by disturbances such as atmospheric phenomena and oceanic phenomena (for example, wind, or wave) is understood as a total through the individuals, a fair evaluation of characteristics of each individual can be made.

Based on the evaluation value of each individual derived by the evaluation value calculation process (step 1-2), it is evaluated whether the evaluation value is an optimal boat operation characteristic (step 1-3). As a result of the evaluation, it is decided whether an optimal boat operation characteristic is obtained (step 1-4). If the optimal boat operation characteristic is obtained, the evolutionary process is finished. If not, the process proceeds to an evolutionary calculation module to generate individuals of the next generation (step 1-5).

b. Evolutionary Process in an Interactive Evolutionary Process Unit

Figure 9:
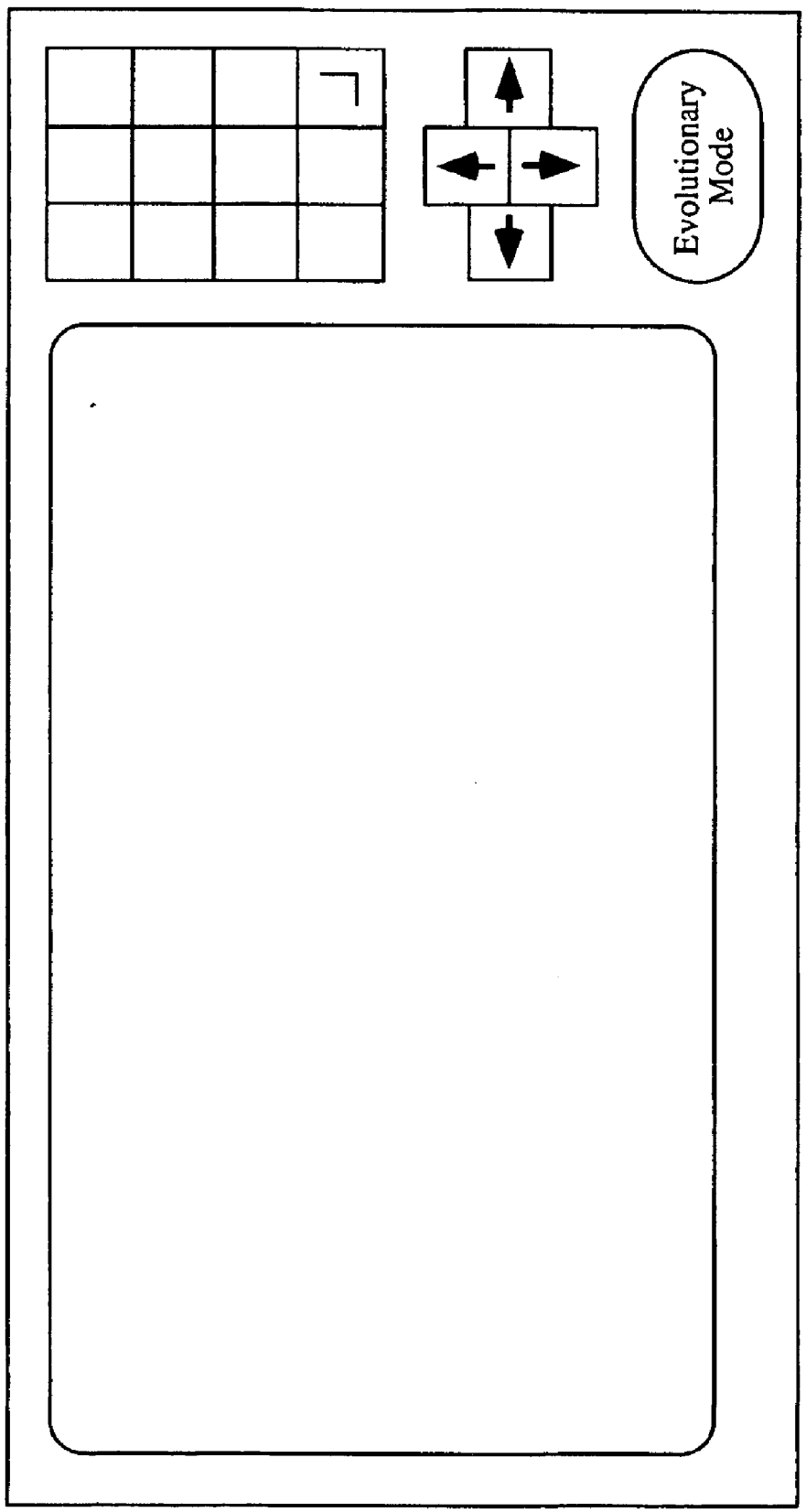
FIG. 9 illustrates one example of an interface for switching between regular control mode and evolutionary mode.

FIG. 9 illustrates one example of an interface for switching between regular control mode and evolutionary mode. As shown in FIG. 7, the interactive evolutionary process unit has two modes: a regular control mode and an evolutionary mode. The switching (step 2-1) between the regular control mode and the evolutionary mode is made in accordance with the conditions fixed beforehand, for example, time or user's intention through an interface shown in FIG. 9.

FIG. 10 illustrates one example of seeking a total of fitness of fuzzy rules. The regular control mode performs fuzzy control using a fuzzy rule table established at the time, and at the same time seeks a total of fitness of the fuzzy rules till evolutionary mode is switched on (step 2-2). To be specific, as shown in FIG. 10, calculation results of the fitness table for calculating the fitness of each fuzzy rule at a certain time are added to the total table for calculating a total of fitness till the evolutionary mode is switched on (step 2-3), which is terminated at the time the evolutionary mode is switched on.

When the evolutionary mode is switched on, as shown in FIG. 6, referring to the total table an arbitrary number of fuzzy rules are encoded into chromosomes in the order of higher total (step 2-4), which, as initials, are added to perturbation following a normal distribution to produce a first generation comprising a plurality of initial individuals (step 2-5). A trial ride is made using parameters for any individual in the first generation (step 2-6). The user inputs an evaluation value for the individual (step 2-7).

Based on the evaluation value, it is decided whether a desired boat operation characteristic is obtained (step 2-8). If it is, the individual is regarded as best and the evolutionary process is terminated. If it is not, it is decided whether a trial ride and an evaluation about all the individuals in the first generation are finished (step 2-9). If the trial ride and the evaluation about all the individuals are not finished, the fuzzy rules of the fuzzy control module are changed to those of other individuals (step 2-10) and a ride is tried once again (step 2-6). If they are, it is judged whether a stipulated generation is reached (step 2-11). If it is judged so, the individual with the highest evaluation value in the generation is considered to be best and the evolutionary process is ended. If it is not judged so, the evolutionary calculation module begins (step 2-12) to produce individuals to the next generation and make a trial ride and an evaluation using the fuzzy rules for the individuals.

The above process, by which the desired boat operation characteristics are obtained, is repeated till the number of stipulated generations is reached. As a result, a part of the fuzzy rule table for the boat operation fuzzy control module is replaced by the fuzzy rules for the individuals obtained, and the total table is initialized to zero (step 2-13).

Then, when the regular control mode is switched on again, the fuzzy control is performed by using the fuzzy rule table replaced, and a total of fitness for each fuzzy rule at this time is sought till the evolutionary mode is switched on.

Repeating the above process enables the fuzzy rules with a higher total of fitness, i.e., the fuzzy rule in the region frequently used in the present environment, to be optimized in concentration. Since a fuzzy rule in the region not frequently used does not need to be changed, stable control can be achieved even when the fuzzy rule is used.

Now, some of evolutionary computation modules will be exemplified.

a. Genetic Algorithm (GA)

Figure 11:
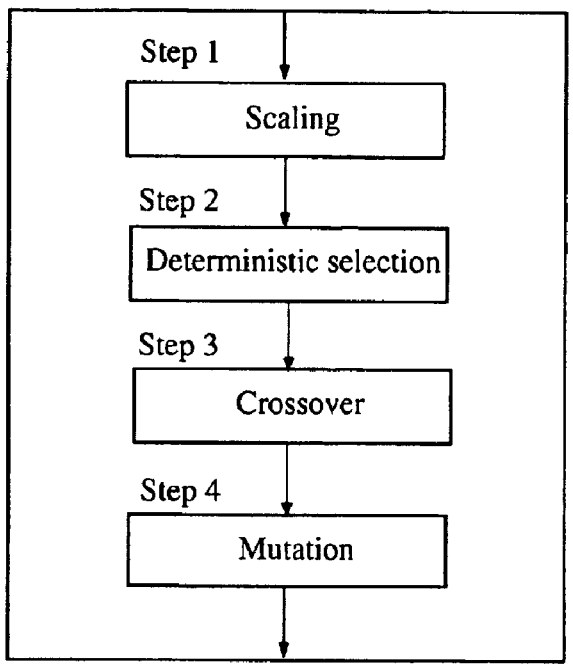
FIG. 11 is a flowchart illustrating an evolutionary computation module when generic algorithm is used as an evolutionary computation method.

FIG. 11 is a flowchart illustrating an evolutionary computation module when generic algorithm is used as an evolutionary computation method. In the module, when a desired characteristic is not obtained after completion of the evaluation of all the individuals to one generation, a group of individuals to the next generation is produced.

With respect to scaling (step 1), a linear transformation of fitness is performed so that the ratio of an average fitness to a maximum fitness in a individual group may be constant.

As for selection, a roulette selection system can be adopted that selects stochastically in proportional to user's evaluation (fitness). A tournament selection system can also be employed that selects one with the best evaluation in the N individuals selected at random.

Regarding crossover (step 3), there are methods such as one-point crossover, two-point crossover, and normal-distribution crossover. It happens that a selected parent for crossover is the same individual. When this situation is left as is, diversity as a individual group is lost. Therefore, if a parent selected for crossover is the same individual, crossover for the same individual should be avoided as much as possible by replacing the individual with another selected individual.

As for mutation (step 4), values are changed at random with a constant probability about each locus for individuals. There is also another method by which perturbation having normal distribution can be added. In the case where different individuals are selected as parents for crossover and the different individuals are genetically the same, mutation takes place with higher probability than usual for both of the parents to be crossed over.

In addition to that mentioned above, a method of the alternation of generations called "regeneration," which replaces all the individuals to one generation one time, may be employed.

When the alternation of generations is applied strictly, there is a possibility that an individual with high evaluation may be destroyed. Accordingly, elite preservation strategy can be used together that unconditionally leaves the elite (any number of individuals that have acquired high evaluation) to the next generation.

b. Evolutionary Strategy (ES)

Figure 12:
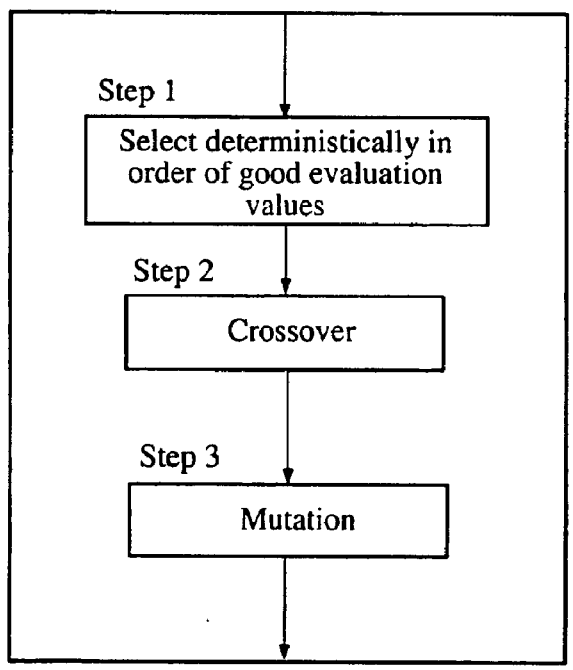
FIG. 12 is a flowchart illustrating an evolutionary computation module when evolutionary strategy is used as an evolutionary computation method.

FIG. 12 is a flowchart illustrating an evolutionary computation module when evolutionary strategy is used as an evolutionary computation method. The module produces an individual group for the next generation, after completing evaluation of all the individuals to one generation, when a desired characteristic is not obtained.

As for selection (step 1), two exemplary kinds of methods are explained since methods of selection are different owing to the kinds of evolutionary strategy. ($\mu$, $\lambda$)—ES: This evolutionary strategy deterministically selects $\mu$ individuals in the order of better fitness from $\lambda$ child individuals produced by $\mu$ parent individuals. ($\mu+\lambda$)—ES: This evolutionary strategy deterministically selects $\mu$ individuals in the order of better fitness from $\mu$ parent individuals and $\lambda$ child individuals combined.

In addition to the methods mentioned above, evolutionary strategy includes other methods below. When these methods are used, a selection suitable for the methods should be made.

(1, 1)—ES: Random Walk (RW)
(1, 1)—ES: Hill Climbing (HC)
(1, $\lambda$)—ES, (1+$\lambda$)—ES: Adjacent search method
($\mu$+1)—ES: Successive generation multi-point search method Regarding crossover (step 2), the normal distribution is used. Parents' values can be succeeded for each parameter, and child's values can be a middle point, interpolated point or extrapolated point.

With respect to mutation (step 3), perturbation having the normal distribution is added to each parameter. The dispersion of the normal distribution may be adjusted every parameter or may have interrelationship between parameters.

Since the evolutionary strategy (ES), as explained above, uses each parameter as a real number, it has the advantage that a transformation from phenotype to genotype is no longer necessary. Using a method of crossover having continuity of real numbers such as normal distribution crossover enables parents' character to be reflected more heavily to child's character than the binary code frequently used in genetic algorithm or the gray code crossed over at one point or many points.

c. Evolutionary Programming (EP)

Figure 13:
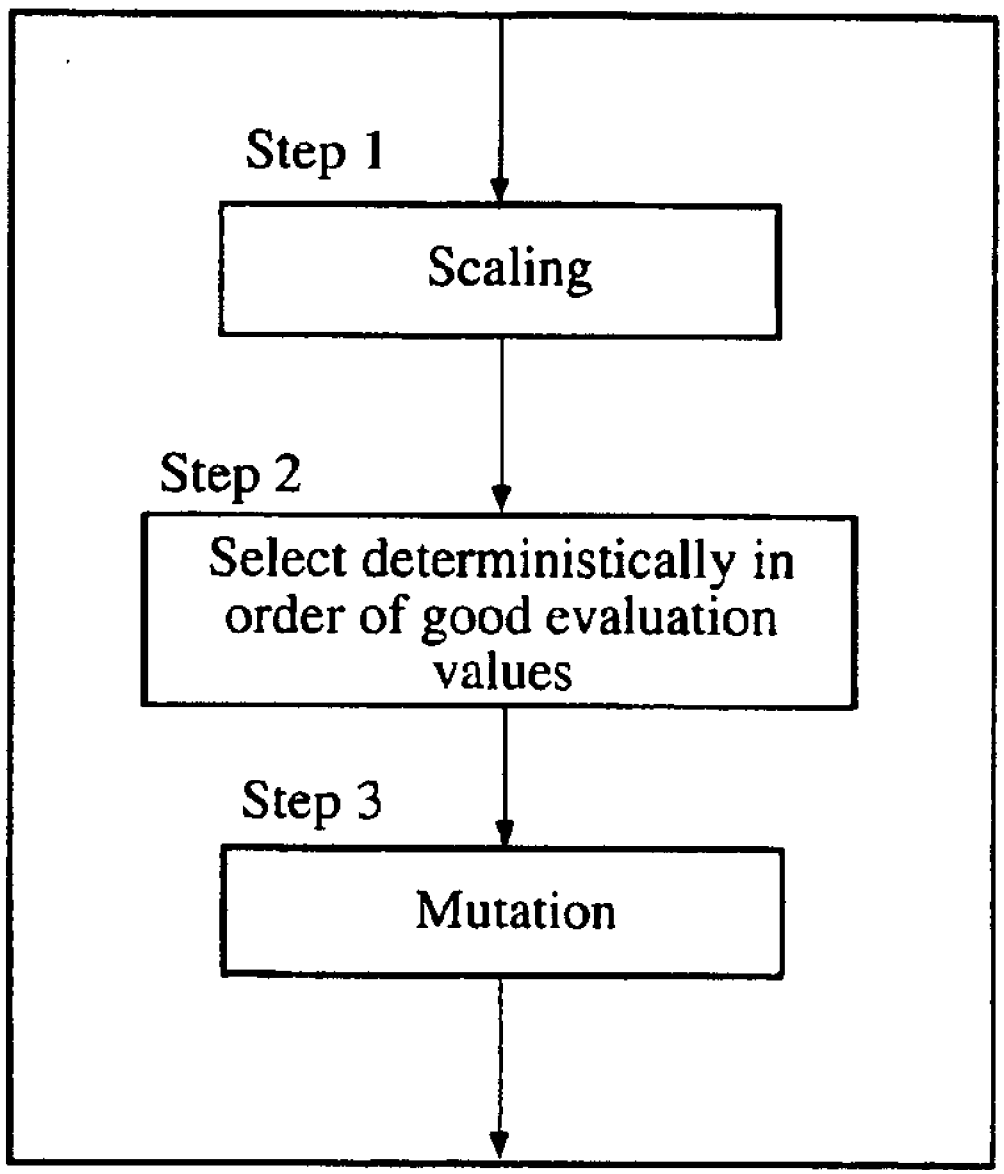
FIG. 13 is a flowchart illustrating an evolutionary computation module when evolutionary programming is used as an evolutionary computation method.

FIG. 13 is a flowchart illustrating an evolutionary computation module when evolutionary programming is used as an evolutionary computation method.

With regard to scaling (step 1), when the number of individuals is $\mu$, the 2$\mu$ individuals, combined with the individuals before perturbation is added and the individuals after perturbation is added, are compared with the q individuals selected at random. The superior number is defined as fitness of the individuals.

In selection (step 2), $\mu$ individuals are selected in the order of good fitness from individual groups produced. The selection is deterministic, but since scaling is stochastic, the selection is substantially stochastic.

Since the evolutionary programming (EP) mentioned above uses each parameter as a real number, it has the advantage that a transformation from phenotype to genotype is no longer necessary. As no crossover is used, there is no limitation in phenotype. The parameters of the genetic algorithm should not be in a sting as in the evolutionary strategy, and may be in a tree structure.

The use environment of the planing boat in the embodiments can be varied remarkably owing to the change of weathers or seasons. The preference of users varies significantly. Therefore, it is impossible to acquire boat speed control characteristics all users can be satisfied with under every use environment, in the design stage or the setting stage before shipment. Since an outboard motor and a hull are manufactured individually, throttle control and trim angle control for the hull are indispensable so as to achieve optimal boat speed control, in addition to the characteristics of use environment and a user. When a fuzzy controller is used as a control device, it is difficult to optimize the characteristics of the fuzzy controller to fit all conditions.

However, as described above, because the parameters for the boat operation fuzzy control module which controls an electronic throttle valve and a trim may be optimized in real time by using the evolutionary calculation, the invention has the advantage that the boat control can be achieved that suits all conditions.

The controlled system that can be optimized by the optimization method in accordance with the invention is not limited to the outboard motor and the trimming apparatus of the planing boat shown in FIGS. 3–14. The controlled system can be any controlled system as far as it is controlled by a control device that has a fuzzy inference system, for example, the controlled system shown in FIGS. 14–15.

Figure 14:
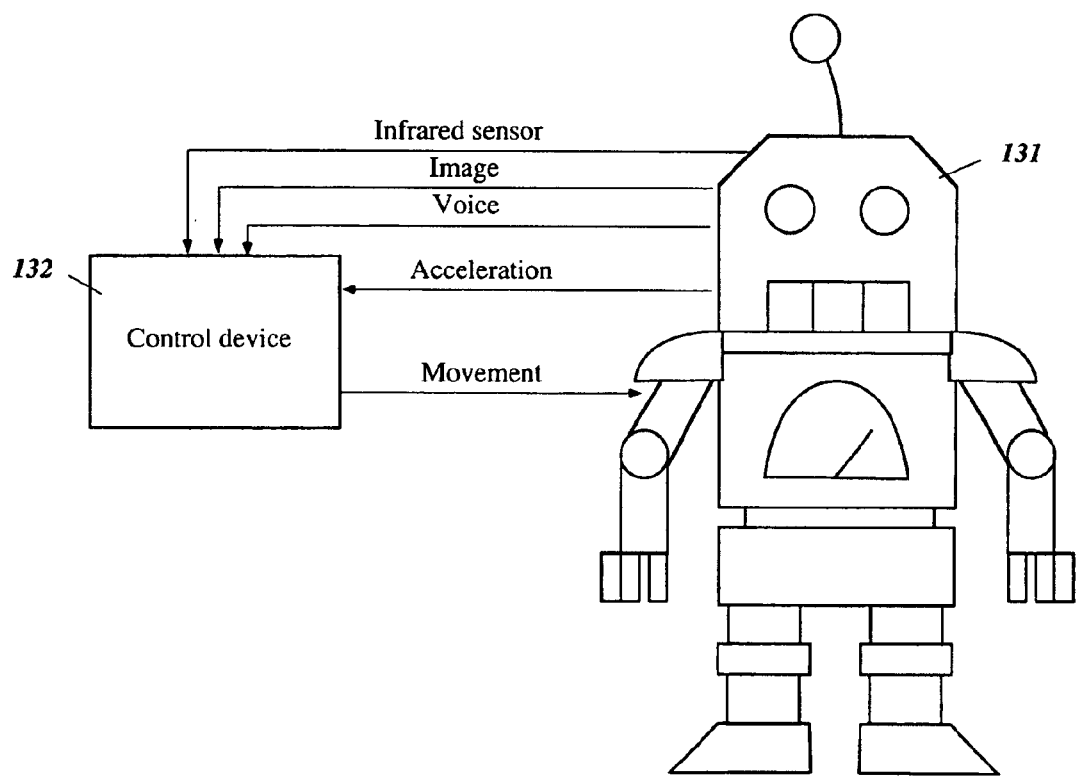
FIG. 14 is another embodiment in accordance with the invention.

FIG. 14 shows an embodiment where the optimization method in accordance with the invention is applied to a control device that controls the movement of a robot. In the embodiment, the control device 132 inputs information from an infrared sensor attached to the robot 131, an image input device such as a camera, a voice input device such as a microphone, and an accelerator sensor. The control device 132 includes a fuzzy control module (not shown) which outputs information on the movement for the robot 131. The fuzzy control module can be optimized in real time.

The parameters to be optimized may selected arbitrarily. Evaluation for optimization is made directly by a user through an appropriate input device. The input device to which the user will apply evaluation can be provided separately. For example, the input device may be constructed to detect the state of the user by the image input device and the voice image input device, and based on the detection results, to recognize the evaluation of the user. The construction brings about the advantage that the robot's movement can be optimized as if the robot were understanding the user's intention.

In this way, when the optimization method according to the invention is applied to the control device that controls the movement of the robot, the robot can execute optimal movements, according to a change of robot's bodies (for example, a change from a human-type robot to a dog-type robot), a change of use environments, and user's preference.

Figure 15:
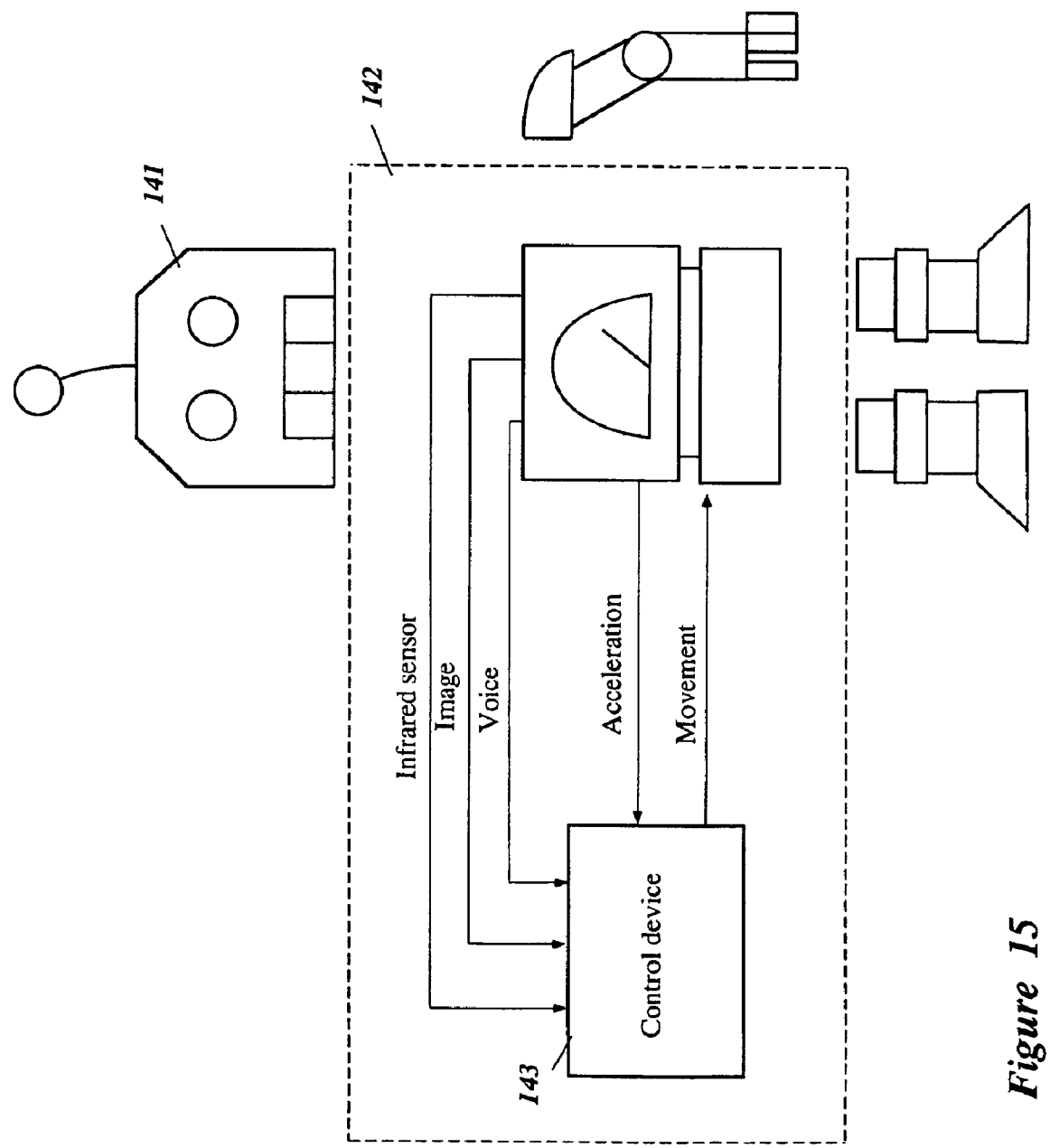
FIG. 15 is still another embodiment in accordance with the invention.

FIG. 15 shows an embodiment where a head, arms, and/or legs of a robot 141 may be interchangeably mounted to a body thereof. The body 142 of the robot 141 contains a control device 143 that controls the movement of each part. When the optimization method in accordance with the invention is applied to the control device 143, even if the head, arms, and/or legs are interchanged, the control device 143 can be optimized so that an optimal movement may be made according to a specified part mounted. Accordingly, since the limitations to the parts of the robot 141 are reduced, interchange of the parts can be easily made. Thus, the advantages are provided that the robot 141 itself can perform various types of jobs or entertainment movements only by interchanging the parts, which increases availability of the robot 141.

Figure 16:
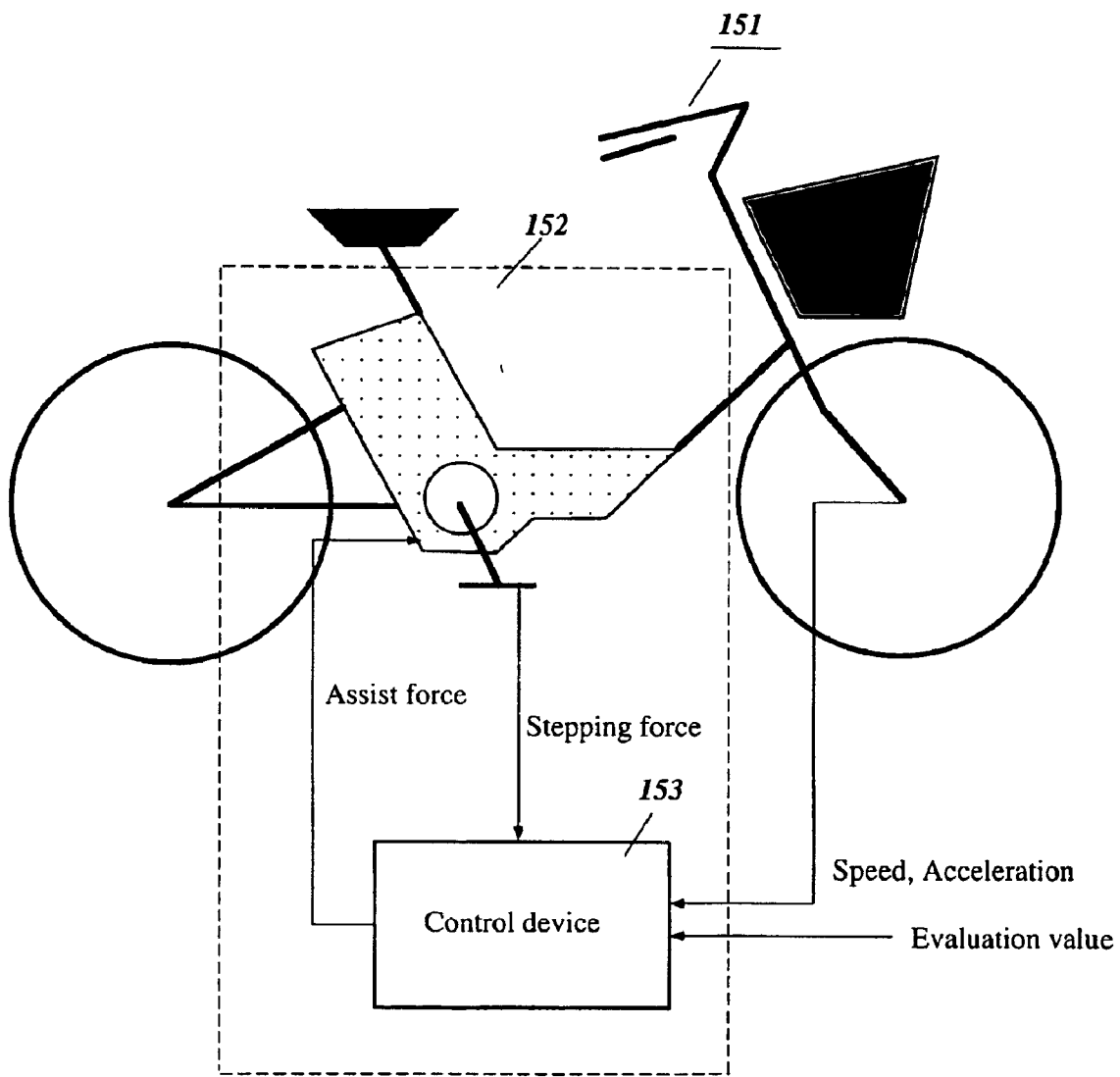
FIG. 16 is still another embodiment in accordance with the invention.

FIG. 16 shows an embodiment where the optimization method in accordance with the invention is applied to a control device 153 of a bicycle 151 with an electrically-driven auxiliary power unit 152. The control device 153, including a fuzzy control module, receives a stepping force for a pedal from a user, a speed, an acceleration, and an evaluation value, and outputs an assist force to the electrically-driven auxiliary power unit 152, decided by the fuzzy control module. The fuzzy control module is optimized in real time.

Since the optimization method in accordance with the invention is applied to the control device 153 of the bicycle 151 with the electrically-driven auxiliary power unit 152, even if the bicycle 151 may be interchanged to a new bicycle to which the control device 153 is attached, the assist force can be optimized in real time for the new bicycle, which reduce the limitations to the kinds of bicycle. Even when a bicycle and an electrically-driven auxiliary power unit are manufactured independently, the electrically-driven auxiliary power unit can easily be adapted to each of the bicycles. The advantage is provided that in accordance with the preference to use environment, age or physique of a user, an assist force, or duration of a battery, a control device is optimized in real time so that an optimal assist force may be generated. As far as an apparatus has an electrically-driven auxiliary power unit, the same effect can be obtained from any apparatus, for example, a wheelchair.

In the embodiments explained above, the optimization method in accordance with the invention is applied to the fuzzy controller which outputs the manipulated variable (the electronic throttle valve opening variation and trim angle variation) of the controlled system. However, the invention is not limited to the embodiments, and is applicable to a control device having any fuzzy inference system so long as the control device includes a fuzzy inference system that decides output concerning a manipulated variable. The control device for example, may be the one that contains a fuzzy inference system for deciding the coefficients of a manipulated variable or a compensated amount. In addition, the invention is applicable to a control device having a fuzzy intention determination system and a fuzzy neural controller.

The optimization method in accordance with the invention encodes the parameters concerning the fuzzy inference system of the control device into chromosomes, optimizing in real time using evolutionary calculation, and optimizes the control device against unexpected parameter variations of the controlled system and disturbances. Accordingly, the advantage is provided that optimal control of a controlled system can be performed in accordance with all use environments and characteristics of a user.

By making the parameters that are coded into chromosomes a part of parameters on a fuzzy inference system, the advantage is produced that only parameters necessary for adaptation can be extracted, search spaces can be limited, and an optimization can be made at high speeds, without destroying parameters unnecessary for optimization.

When a total of fitness of a membership function (the degree input or output corresponds to the membership function within a predetermine period of time) is larger, it is considered that the membership function makes a great influence on inference. Therefore, by deterministically or stochastically selecting the parameters to be encoded into chromosomes depending on a total of fitness of the membership function within any period of time, for example, a certain number of parameters are selected in the order of the larger total of fitness, and optimizing them, the advantage is obtained that optimal control is possible without optimizing all parameters.

When a total of fitness of a fuzzy rule (the degree a fuzzy rule in a rule table is fired within a predetermine period of time) is larger, it is considered that the fuzzy rule makes a great influence on inference. Therefore, by deterministically or stochastically selecting the parameters to be encoded into chromosomes depending on a total of fitness of the fuzzy rule within any period of time, for example, some parameters having the larger total of fitness are selected, and optimizing them, the advantage is obtained that optimal control is possible without optimizing all parameters.

By selecting only parameters beyond a threshold of fitness determined for the parameters, an easy adjustment can be made with regard to parameter selection. For example, setting a maximum threshold precludes selecting parameters that cannot be changed or need not be changed.

By raising or lowering the threshold according to the number of times selected for the corresponding parameters, for example, by raising the threshold according to the number of times selected, the possibility that the parameters with higher selected number of times will be selected can be reduced. In this way, an easy adjustment of parameter selection can be made, without destroying the parameters that have undergone optimization.

By raising or lowering the threshold according to the time elapsed since the previous selection of the corresponding parameters, for example, lowering the threshold according to the time elapsed, the possibility that the parameters have not selected since the previous selection will be selected can be enhanced. In this way, an easy adjustment of parameter selection can be made, which advances optimization of parameters that have not experienced optimization.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of real-time optimization of a control device provided with a fuzzy inference system for controlling a machine, said fuzzy inference system comprising a matrix of fuzzy rules which are regulated by preselected parameters, said method comprising the steps of:
   operating the machine using the fuzzy inference system of the control device;
   optimizing in real-time the input-output relationship of the fuzzy inference system by:
      (i) selecting a section from the fuzzy rule matrix including multiple sections, and
      (ii) revising the fuzzy rule matrix by extracting the section from the matrix and coding elements of the section into chromosomes,
   said chromosomes being subjected to evolutionary computation, wherein at least one fitted individual is selected based on a user's ultimate choice or a preselected target; and
   operating the machine using the optimized fuzzy inference system.

2. The method according to claim 1, further comprising monitoring the fuzzy rule matrix in use while operating the machine, and evaluating the section extracted in (ii) by the user using an interface displayed to the user.

3. The method of claim 1, wherein the selecting of a section is conducted deterministically or stochastically according to a total of fitness of membership functions defining the fuzzy rule matrix within a given period of time.

4. The method of claim 1, wherein the selecting of a section is conducted deterministically or stochastically according to a total of fitness of fuzzy rules within a given period of time.

5. The method of claim 1, further comprising evaluating fitness of fuzzy rules, wherein in the selecting step, a section whose fitness is over a threshold is selected for encoding.

6. The method of claim 1, wherein the control device comprises two system, wherein in one system, the at least one fitted individual is selected by the user, and in another system, the at least one fitted individual is selected autonomously based on a pre-selected target.

7. A method of real-time optimization of a control device comprising a fuzzy inference system for controlling a machine, comprising:

encoding parameters used in the fuzzy inference system into chromosomes, said fuzzy inference system determining an output associated with a manipulated variable of the machine based on preselected input signals, wherein the parameters encoded into chromosomes include at least one of number, shape, position, and expanse of membership functions; and optimizing the output of the control device by subjecting the chromosomes to evolutionary computation on a real-time basis.

8. The method of claim 7, wherein the parameters encoded into chromosomes include fuzzy rules.

9. A method of real-time optimization of a control device comprising a fuzzy inference system for controlling a machine, comprising:

encoding standardized coefficients for input and output values of the fuzzy inference system into chromosomes, said fuzzy inference system determining an output associated with a manipulated variable of the machine based on preselected input signals; and optimizing the output of the control device by subjecting the chromosomes to evolutionary computation on a real-time basis.

10. A method of real-time optimization of a control device comprising a fuzzy inference system for controlling a machine, comprising:

selecting a part of parameters used in the fuzzy inference system deterministically or stochastically according to a total of fitness of membership functions defining the fuzzy inference system within a given period of time, said fuzzy inference system determining an output associated with a manipulated variable of the machine based on preselected input signals, said fitness of membership functions being evaluated at a non-evolutionary mode;

encoding the part of parameters into chromosomes at an evolutionary mode; and optimizing the output of the control device by subjecting the chromosomes to evolutionary computation on a real-time basis at the evolutionary mode.

11. The method of claim 10, wherein the parameters encoded into chromosomes further include standardized coefficients for input and output values of the fuzzy inference system.

12. The method of claim 10, wherein only parameters are selected that exceed a threshold of fitness determined according to the parameters.

13. The method of claim 12, wherein the threshold is raised or lowered according to selected number of times for corresponding parameters.

14. The method of claim 12, wherein the threshold is raised or lowered according to time elapsed since a previous selection of corresponding parameters.

15. A method of real-time optimization of a control device comprising a fuzzy inference system for controlling a machine, comprising:

selecting a part of parameters used in the fuzzy inference system deterministically or stochastically according to a total of fitness of fuzzy rules within given period of time, said fuzzy inference system determining an output associated with a manipulated variable of the machine based on preselected input signals, said fitness of fuzzy rules being evaluated at a non-evolutionary mode;

encoding the part of parameters into chromosomes at an evolutionary mode; and optimizing the output of the control device by subjecting the chromosomes to evolutionary computation on a real-time basis at the evolutionary mode.

16. The method of claim 15, wherein the parameters encoded into chromosomes further include standardized coefficients for input and output values of the fuzzy inference system.

17. The method of claim 15, wherein only parameters are selected that exceed a threshold of fitness determined according to the parameters.

18. The method of claim 17, wherein the threshold is raised or lowered according to selected number of times for corresponding parameters.

19. The method of claim 17, wherein the threshold is raised or lowered according to time elapsed since a previous selection of corresponding parameters.

* * * * *